350-333
4/17/79 XR 4,150,361
SR

United States Patent [19]

Yoshida

[11] 4,150,361

[45] Apr. 17, 1979

[54] DRIVE CONTROL FOR DRIVE CIRCUIT OF LIQUID CRYSTAL DISPLAY

[75] Inventor: Makoto Yoshida, Tokorozawa, Japan

[73] Assignee: Citizen Watch Co., Ltd., Tokyo, Japan

[21] Appl. No.: 665,559

[22] Filed: Mar. 10, 1976

[30] Foreign Application Priority Data

Mar. 11, 1975 [JP] Japan ................................ 50-29291

[51] Int. Cl.2 ............................................ G06F 3/14

[52] U.S. Cl. .................................. 340/765; 340/804; 350/333

[58] Field of Search .......................... 340/324 M, 336; 350/160 LC, 330-334

[56] References Cited

U.S. PATENT DOCUMENTS

| | | | |
|---|---|---|---|
| 3,505,804 | 4/1970 | Hofstein | 340/336 |
| 3,653,745 | 4/1972 | Mao | 340/336 |
| 3,891,306 | 6/1975 | Mitomo et al. | 340/324 M |
| 3,936,676 | 2/1976 | Fujita | 340/324 M |
| 3,936,815 | 2/1976 | Kogure et al. | 340/324 M |
| 3,938,136 | 2/1976 | Kawakami | 340/324 M |

*Primary Examiner*—Marshall M. Curtis
*Attorney, Agent, or Firm*—Sherman & Shalloway

[57] ABSTRACT

A liquid crystal display driver control circuit device comprising a control circuit turning on and off a display cell between an alternating current voltage supply source and the input of a liquid crystal driver circuit and said control circuit controlling the display of at least one digit figure or mark by means of a small number of elements.

1 Claim, 7 Drawing Figures

DRIVE CONTROL FOR DRIVE CIRCUIT OF LIQUID CRYSTAL DISPLAY

BACKGROUND OF THE INVENTION

This invention relates to an electronic driver control circuit, and more particularly to a driver circuit for use in a liquid crystal display device displaying figures and the like.

DESCRIPTION OF THE PRIOR ART

Generally, in segment assembly type display elements, especially in ⊟-shaped arrays using liquid crystal cells, some segment arrays are selected in accordance with voltage signals so that figures or marks may be lighted up.

When there are plural display digits, there are different modes in which all digits are lighted up and in which a part of the digits are selectively lighted up.

Three digit figures and figure "1" are used for a timepiece display. Normally, the hour and minute digits are displayed while the second digit is displayed by means of a change-over switch. However, in this case, two digit figures are merely utilized to display seconds and the remaining figure digits and the figure "1" are not used.

When provision is made of five digit figures and the figure "1" to display hours, minutes and seconds, there is proposed a timepiece which has a circuit for displaying only a digit which needs to be corrected and for extinguishing the remaining digits when the displayed time is corrected.

To control a liquid crystal display device, an alternating voltage is applied to cells. Voltages reversed in phase with one another are applied between a pair of electrodes in segments to be displayed and voltages in phase with one another are supplied to segments not to be displayed. Accordingly, it is required that signals applied to their respective segments be separately treated so as to control the display. In order to display only a one digit figure and extinguish the remaining figures, the display cannot be controlled unless use is made of AND gates having a number equal to the number of segments. As the result, the number of elements increases, which results in the design and manufacture of such a circuit being complicated and expensive.

SUMMARY OF THE INVENTION

An object of the instant invention is to provide a rational driver control circuit provided with a special circuit for every unit to light up and extinguish each digit of a display composed of definite segments when use is made of a liquid crystal display device including a segment assembly.

Another object of the invention is to provide a more rational driver control circuit which has the same structure as that of the other unit circuits therein.

The above objects can be attained by the provision of a control circuit operating each unit display for turning on and off the display between an alternating voltage supply source and the input of the liquid crystal driving circuit.

BRIEF DESCRIPTION OF THE DRAWINGS

This invention will be more readily understood by way of example from the following description of a circuit diagram in accordance therewith, reference being made to the accompanying drawings, in which.

DETAILED DESCRIPTION OF PREFERRED EMBODIMENT

Figure 1:
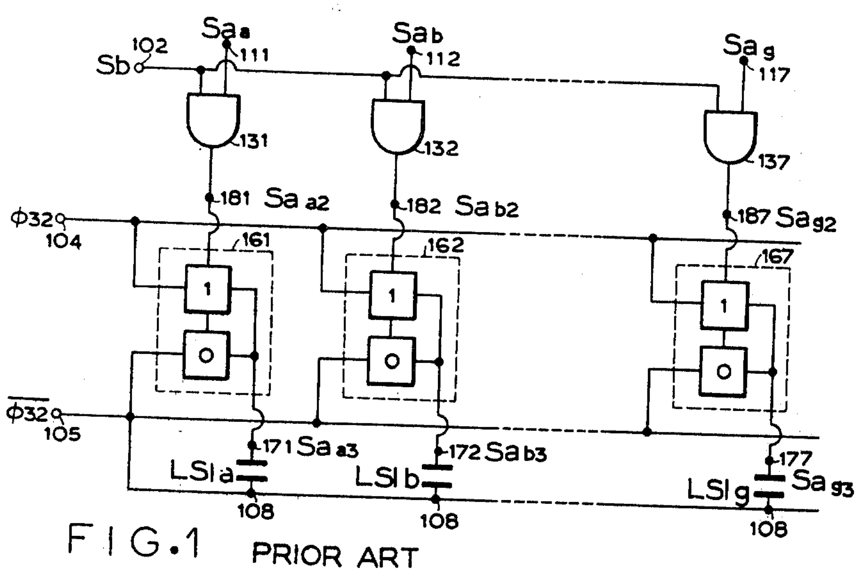
FIG. 1 PRIOR ART
FIG. 1 is a circuit diagram showing a conventional driver control circuit for liquid crystal device.
Figure 7:
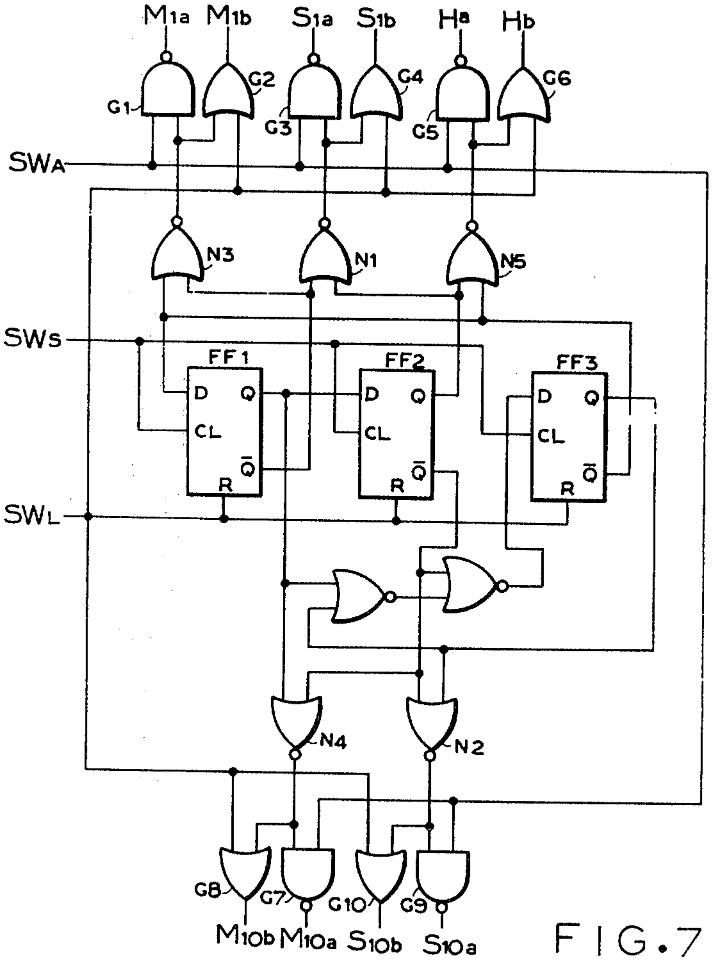
FIG. 7 is a detailed logic circuit showing the content of the block 13 in FIG. 6.

FIG. 1 shows a conventional circuit for use in a liquid crystal display device. In FIG. 1, reference numerals 111, 112 . . . 117 are terminals to which segment signals Saa, Sab . . . Sag are delivered from a decoder 7(FIG. 7). The terminals 111, 112 . . . 117 are connected to the inputs of AND gate 131, 132 . . . 137 respectively. The respective segment signals correspond to "1" in case of lighting up the display and "0" in case of extinguishing the display. Reference numeral 102 depicts a display control terminal connected to the inputs of the AND gates.

If signal Sb delivered to the terminal 102 is "1," it is a display instruction signal, and if "0," an extinguishing signal.

Figures 5, 6:
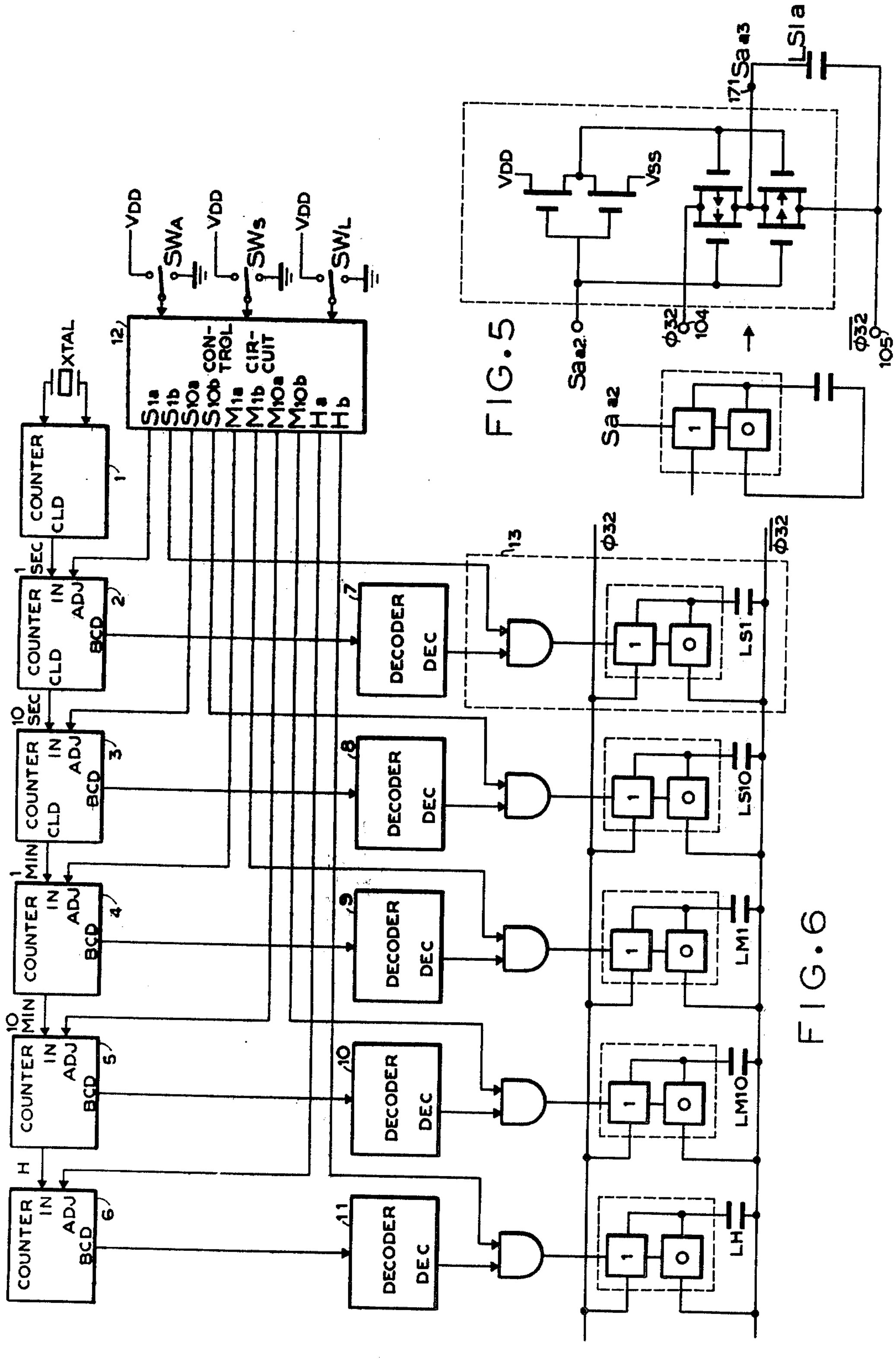
FIG. 6 is a whole block diagram of an electronic circuit for use in a liquid crystal display device wherein use is made of a driver control circuit.

Reference numerals 104 and 105 are alternating current voltage input terminals to which 32 Hz signals $\phi_{32}$ and $\bar{\phi}_{32}$ are delivered which are reversed in phase with each other. Numerals 161, 162 . . . 167 illustrate driver circuits and each comprises two transmission gates and one inverter as shown in FIG. 5. Each driver circuit is composed of six transistors.

These driver circuits have two input terminals connected to respective terminals 104 and 106, one control terminal being connected to the output terminals 181, 182 . . . 187 of the corresponding AND gates and another output terminal being connected to the output terminals 171, 172 . . . 177 toward the corresponding liquid crystal segments.

The connections are made such that when the output signals $Saa_2$, $Sab_2$ . . . $Sag_2$ are "1," signal $\phi_{32}$ appears on the output terminals 171, 172 . . . 177 and when "0," the signal $\bar{\phi}_{32}$ does the same.

Reference numerals 171, 172 . . . 177 are also segment input terminals to which the signals $Saa_3$, $Sab_3$ . . . $Sag_3$ are delivered. Numeral 108 designates a common input terminal at which output signal $\bar{\phi}_{32}$ for the common terminal appears.

The operation of the circuit as shown in FIG. 1 is as follows. When signals $Saa_1$, $Sab_1$ . . . $Sag_1$ are applied to the segment signal terminals 111, 112 . . . 117, AND gates 131, 132 . . . 137 are controlled by display control signals delivered to the terminal 102. If signal Sb at the terminal 102 is "1," the outputs $Saa_2$, $Sab_2$ . . . $Sag_2$ are equal to signals $Saa_1$, . . . $Sag_1$ whereby the information is displayed by the liquid crystal cells. On the other hand, if the signal Sb is "0," all of the output signals from the gates 131, 132 . . . 137 become "0" whereby all of the control terminals toward the driver circuits 161, 162 . . . 167 are switched to "0," as a result of which the signal $\bar{\phi}_{32}$ is selected to appear at the output terminals 171, 172 . . . 177. The signal $\bar{\phi}_{32}$ is in phase with the signal $\bar{\phi}_{32}$ at the common terminal 108. No potential difference is caused between the electrodes of liquid crystal segments LSIa, LSIb . . . LSIg and the liquid crystal is not turned on. Therefore, it is clearly understood from the above that the number of AND gates connected to display control terminals is required to be equal to that of the display segments. This is not an economical approach. In addition, the resulting overlapping, complex wiring causes erroneous operations on the integrated circuit, parasitic capacitances and the like.

Figure 3:
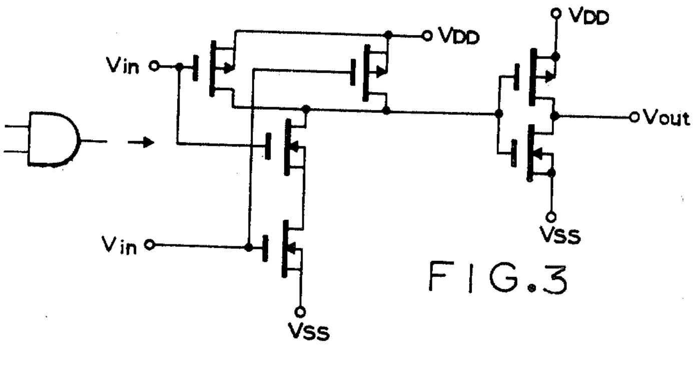
FIGS. 3, 4 and 5 shown equivalent circuits of the right and left side ones therein.
Figure 4:
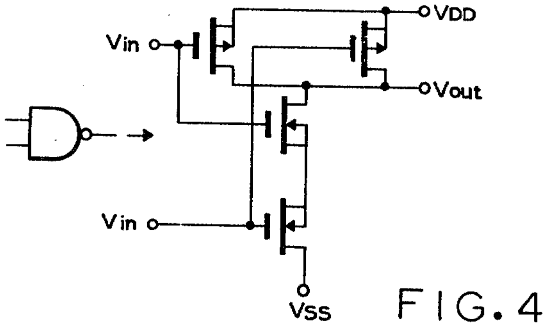

As is shown in FIG. 3, the AND gate is composed of six transistors. If the electronic circuit is wholly modified so that a NAND gate is used to control the display, only four transistors are necessary as shown in FIG. 4 and as a result, a minimum of twenty-eight transistors (4×7) are required for each digit figure.

Figure 2:
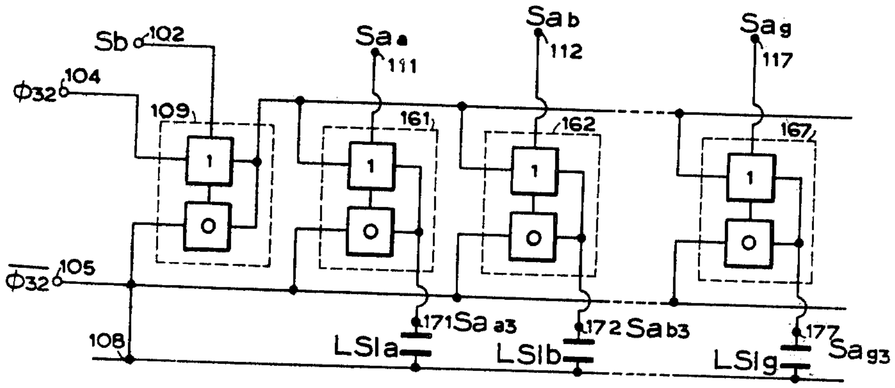
FIG. 2 is a circuit diagram showing one embodiment of a driver control circuit according to this invention.

FIG. 2 is a circuit diagram showing one embodiment of a liquid crystal display driver control circuit according to this invention. In FIGS. 1 and 2, the same reference numerals refer to similar parts.

The circuit in FIG. 2 is different from that in FIG. 1 since provision is made for a driver circuit 109 and AND gates 131, 132 . . . 137 are not utilized. The driver control circuit has the same circuitry as that of the driver circuits 161, 162 . . . 167. To one input of the driver control circuit 109, signal $\phi_{32}$ is delivered and to the other input, signal $\bar{\phi}_{32}$ is delivered. By having all digit displays controlled by adjusting only the driver control circuit 109, the terminals 111, 112 . . . 117 are directly connected to the control circuits of the driver circuit 161, 162 . . . 167, respectively, and signals Saa, Sab . . . Sag are delivered to the corresponding control terminals of the circuit.

The terminal 102 is directly connected to the inputs of the control terminals of the corresponding driver circuits. If a display control signal Sb delivered to the terminal 102 is "1," the output of the driver control circuit 109 becomes $\phi_{32}$. Since the output terminal of the driver control circuit 109 is connected to one of two input terminals of the respective driver circuits 161, 162 . . . 167, the input signals $Saa_3$, $Sab_3$ . . . $Sag_3$ applied to the liquid crystal segments LSIa, LSIb . . . LSIg are determined by the state of "1" or "0" of the segment signals $Saa_1$, $Sab_1$ . . . $Sag_1$ whereby the liquid crystal display device displays the figures.

However, if the display control signal $Sb_1$ is "0," both of the two input terminals of the respective driver circuits 161, 162 . . . 167 become connected to signal $\phi_{32}$ since the output of the driver control circuit 109 is connected to the signal $\bar{\phi}_{32}$ as mentioned above. Even if the segment signals Saa, Sab . . . Sag are in any conditions the outputs of the driver circuit $\bar{\phi}_{32}$, thereby being in phase with the common terminal 108 so that the liquid crystal display device LSI does not display all of the segments.

According to this embodiment, the driver control circuit of this invention can attain with a small number of elements (six transistors in the above embodiment) the same effect is achieved as the conventional circuit composed of seven AND gates or NAND gates, for example, requiring twenty-eight transistors as mentioned above. Therefore, twenty-two transistors can be saved for each figure digit.

In addition, it is easy to manufacture the circuit of this invention since the driver control circuit 109 has the same structure as those of the driver circuit 161, 162 . . . 167.

In this embodiment, the driver control circuit 109 and driver circuits 161, 162 . . . 167 are composed of two transmission gates and one inverter. However, this part may be formed by the other structure, for example, an AND-OR circuit or an Exclusive-OR circuit or the like.

According to this invention, it is, of course, possible to flash a display with one unit.

The term "one unit display" means a one digit figure in the above embodiment, but it may include two digit figures and furthermore, segment arrays of the optional number less than that of segments of the whole.

Hereinafter the interconnections of the driver control circuits shown in FIG. 1 and FIG. 2 will be described with reference to FIG. 6.

The circuits in FIG. 1 and FIG. 2 correspond to the driver circuit 13 surrounded by a dotted line. Seven outputs Saa, Sab, Sac, Sad, Sae, Saf and Sag for seven segments being the outputs of the decoder 7 in FIG. 6 are delivered to the input terminals 111, 112 . . . 117 in FIG. 1. The three signals out of seven are shown and the end alphabet designates the position of the segment arranged in ⊟-shaped array.

By utilizing FIGS. 6 and 7, described is an embodiment in which the device of this invention is adapted to a liquid crystal display timepiece. This electronic circuit is provided with three switches SWa, SWs, SWl for operation and correction of the display. The switch SWs selects the digit to be corrected and the switch SWa corrects the selected digit. If the second digit is selected by the switch SWs, the other digits are extinguished except the second digit. Every time the switch is pushed, the displayed figure increases by "1" so that the corrected display may be obtained.

By pressing the selecting switch SWs, any digit can be selected as a digit to be corrected and the other digits are extinguished with the selected digit lighting. This electronic circuit includes a safety switch SWl which is always turned on and in this case, the switches SWs and SWa are deactivated so as not to operate even if they are turned on. When the safety switch SWl is turned OFF, the selecting switch SWs and correcting switch SWa are kept in an operable state. In FIG. 6, the high frequency time standard signal of a crystal oscillator (for example, 16,384 Hz) is divided by a counter chain consisting of six stages 1 through 6. Counter 1 divides the high frequency timing signal into a 1-second signal. Counter 2 divides the 1-second signal into a 10-second signal, counting 10 seconds. Counter 3 divides the 10-second signal into a 1-minute signal, counting 6×10 seconds. Counter 4 divides the 1-minute signal into a 10-minute signal, counting 10 minutes. Counter 5 divides the 10-minute signal into a 1-hour signal, counting 6×10 minutes. Counter 6 divides the 1-hour signal into a 1-day signal, counting 24 hours.

Decoders 7–11 are connected to receive the BCD output signal of each of counters 2 through 6 to transform the BCD code signal outputs of said counters into a decimal signal DEC for actuating the corresponding liquid crystal displays representative of seconds (LS1), 10 seconds (LS10), minutes (LM1), 10 minutes (LM10), and hours (LH). Each decoder is connected to its respective liquid crystal display through an AND gate circuit, the other input to each of said AND gates being derived from control circuit 12. Thus, output S1b of control circuit 12 is coupled with the AND gate associated with the second liquid crystal display LS1. In like manner, control circuit 12 outputs S10b, M1b and Hb are respectively connected to the AND gate associated with 10-second liquid crystal display LS10, minute liquid crystal display LM1, 10-minute liquid crystal display LM10, and hour liquid crystal display LH. During normal operation of the watch, the outputs S1b, S10b, M1b, M10b and Hb are at a high state and the liquid crystal display is driven normally by the decimal outputs of the respective decoders 7 through 11.

When safety switch SWl is deactivated to permit time correction, a high state signal is applied through control circuit 12 to the digit selected for correction through one of outputs S1b, S10b, M1b, M10b or Hb. For example, if the second digit is to be corrected, the high state signal is applied through output S1b to the AND gate between decorder 7 and liquid crystal display LS1, so that said liquid crystal display is kept switched on and the other displays are switched off. Since only one selected digit LS1 is displayed and the other display is switched off, the selected digit can clearly be distinguished from the other displays which are switched off.

Also, during time correction, the signal applied by correcting switch SWa is applied through control circuit 12 to a selected one of outputs S1a, S10a, M1a, M10a and Ha which are respectively connected to the correcting terminal ADJ of one of counters 2 through 6 for the selective correction of the setting of the selected digit.

Referring to FIG. 7, we find a circuit diagram for control circuit 12.

Control circuit 12 includes three D-type flip-flops FF1, FF2 and FF3 connected to form a hexadic Johnson counter. Safety switch SWl is connected to reset terminal R of the three flip-flops, and input terminals of the 5 NOR gates $G_2$, $G_4$, $G_6$, $G_8$ and $G_{10}$.

Selection switch SWs is connected to input terminal CL of the three flip-flops. The outputs Q and $\overline{Q}$ of the three flip-flops are directly coupled to NOR gates $N_1$ through $N_5$. The outputs of NOR gates $N_1$ through $N_5$ are coupled to a control terminal of NAND gates $G_1$, $G_3$, $G_5$, $G_7$ and $G_9$, and OR gates $G_2$, $G_4$, $G_6$, $G_8$ and $G_{10}$ in the manner depicted. The NAND gate circuits, the OR gate circuits, the NOR gate circuits, and D-type flip-flops are all conventional in design.

In operation when safety switch SWl is activated, a positive potential is applied to reset terminal R thereby resetting the flip-flops. Accordingly, NAND gates $G_1$, $G_3$ $G_5$, $G_7$ and $G_9$ are closed, OR gates $G_2$, $G_4$, $G_6$, $G_8$ and $G_{10}$ are activated, while correcting switch SWa and selecting switch SWs cannot be activated. If SWa and SWs are actuated, no change will occur. When safety switch SWl is switched off, a negative electrical potential is applied to reset switch R and the Johnson counter circuit is actuated, thereby actuating selecting switch SWs to advance the Johnson counter by one count so that one of the pairs of NAND and OR gates, $G_1$ and $G_2$, $G_3$ and $G_4$, $G_5$ and $G_6$, $G_7$ and $G_8$ or $G_9$ and $G_{10}$ is opened while the other four pairs of NAND and OR gates remain closed. For example, if selecting switch SWs has indexed the Johnson counter so that gates $G_3$ and $G_4$ are open, the second digit is selected.

The present invention is therefore well adapted to carry out the objects and attain the ends and advantages mentioned as well as others inherent therein. The presently preferred embodiments of the invention are given for the purpose of disclosure. Numerous changes in the details of construction, and arrangement of parts will readily suggest themselves to those skilled in the art which changes are encompassed within the spirit of invention contained in the scope of the appended claims.

What is claimed is:

1. A control for a liquid crystal display wherein the liquid crystal display includes a plurality of segments, said control selectively turning the segments "on" and "off" depending on the character to be displayed, said control comprising:

(a) first and second terminals for each segment wherein when there is a potential difference between the terminals the segment is turned "on;"

(b) a driver circuit connected to the first terminal of each segment for selectively controlling that segment;

(c) an input common to each of the driver circuits and to the second terminal of each segment, said input applying an alternating voltage signal of a first phase to the second terminal of each segment and to each driver circuit wherein the driver circuit normally applies the first phase voltage to the segment;

(d) a single driver control circuit having a single output connected to each driver circuit;

(e) an input to said driver control circuit having an alternating voltage impressed thereon which is opposite in phase to the alternating voltage on said common input;

(f) decoder means having outputs connected to each driver circuit wherein when an output is energized by the decoder means the driver circuit applies the opposite phase alternating voltage to the first terminal of the segment connected to the driver means so that the first and second terminals are out of phase which creates a potential difference across the segment thereby turning the segment "on;" and (g) the driver control circuit is formed in the same structure as the driver circuits.

* * * * *